(12) United States Patent
Borgemenke et al.

(10) Patent No.: US 7,845,738 B2
(45) Date of Patent: Dec. 7, 2010

(54) LINEAR SINGLE CHANNEL HYDRAULIC CONTROL UNIT

(75) Inventors: Daniel N. Borgemenke, Springboro, OH (US); David F. Reuter, Beavercreek, OH (US); Jerry L. Newton, Richmond, IN (US); Jeffrey Scott Altherr, Mason, OH (US); Terry Lee Fruehling, Hartford, WI (US)

(73) Assignee: BWI Company Limited S.A., Luxembourg (LU)

( * ) Notice: Subject to any disclaimer, the term of this patent is extended or adjusted under 35 U.S.C. 154(b) by 673 days.

(21) Appl. No.: 11/940,965

(22) Filed: Nov. 15, 2007

(65) Prior Publication Data

US 2009/0127925 A1     May 21, 2009

(51) Int. Cl.
*B60T 8/40* (2006.01)
(52) U.S. Cl. ........... 303/116.1; 303/116.4; 303/DIG. 10
(58) Field of Classification Search ... 303/116.1–116.4, 303/119.1, 119.3, DIG. 10
See application file for complete search history.

(56) References Cited

U.S. PATENT DOCUMENTS 6,634,723 B1 * 10/2003 Ganzel et al. ............ 303/119.3
2002/0053829 A1 * 5/2002 Murayama et al. ....... 303/116.4
2007/0228820 A1 * 10/2007 Nakamura ................ 303/119.3

* cited by examiner

*Primary Examiner*—Melanie Torres Williams
(74) *Attorney, Agent, or Firm*—Dickinson Wright PLLC

(57) ABSTRACT

A hydraulic control unit for a motor vehicle having a motor providing a drive shaft driving a rotatable piston bearing surface at a proximal end of the motor, a hydraulic block providing cavities housing a pumping assembly and fluid control valves, and a control section providing solenoid coils receiving portions of the fluid control valves, with the pump cavity being disposed on a first end of the hydraulic block and the valve cavities being disposed on an opposite end of the hydraulic block, and the pumping assembly being reciprocalably driven by the rotatable piston bearing surface along an axis radially disposed from and otherwise parallel to the axis of rotation of the rotatable piston bearing surface. In another aspect, a pump element having a ball bearing assembly mounted at an oblique angle with respect to the axis of rotation of a seat, and a pumping assembly reciprocally bearing against an outer portion of the ball bearing assembly.

20 Claims, 10 Drawing Sheets

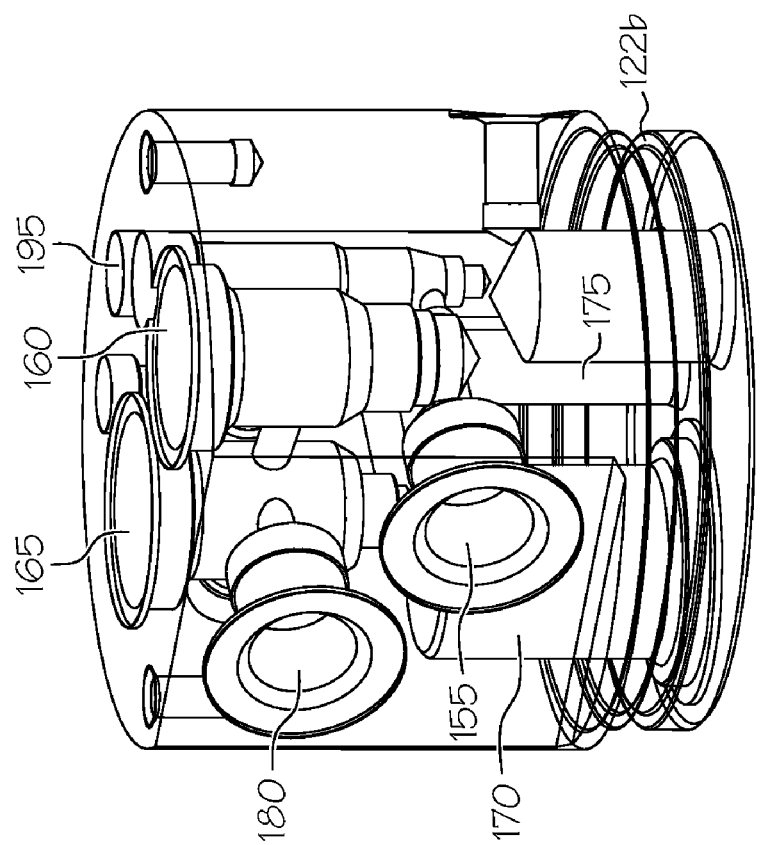
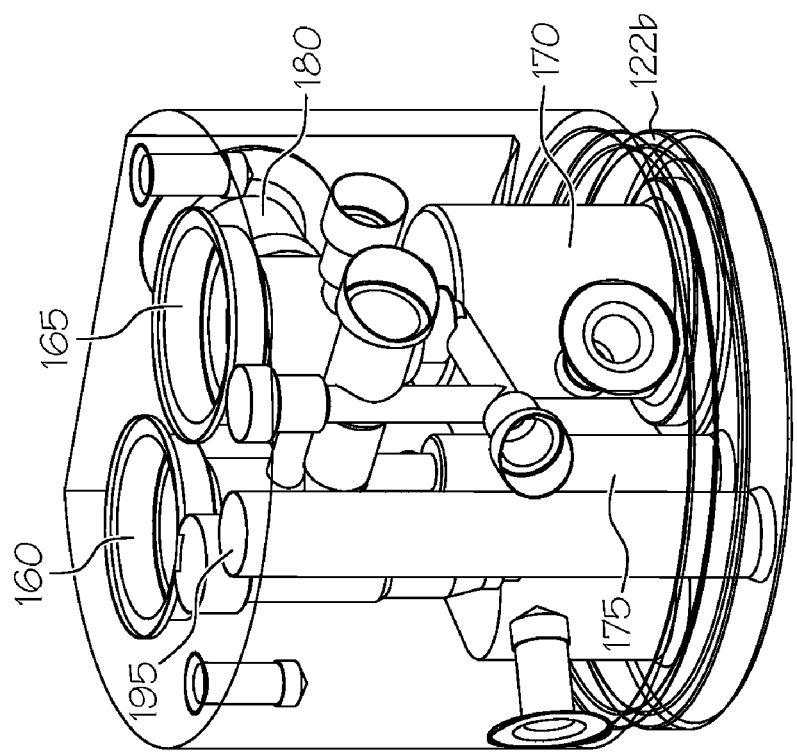

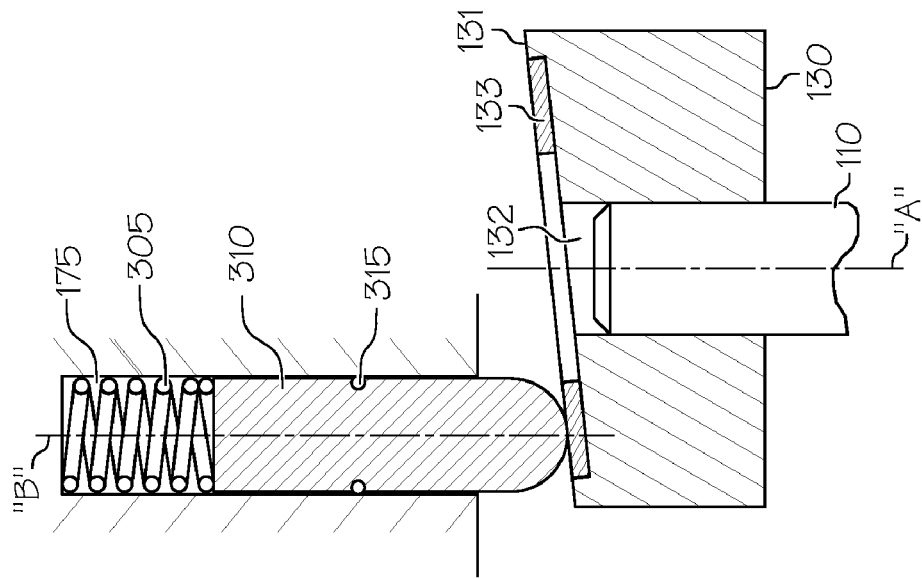
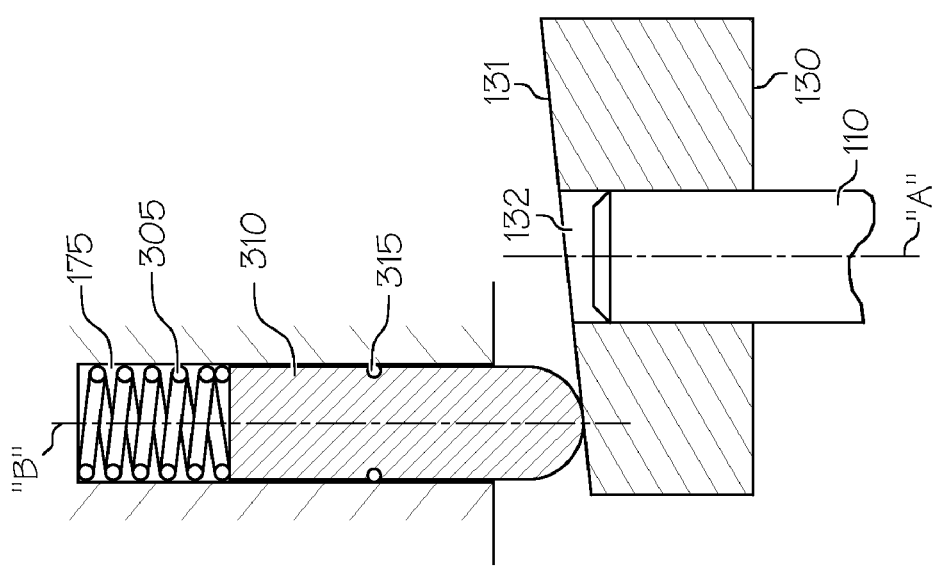

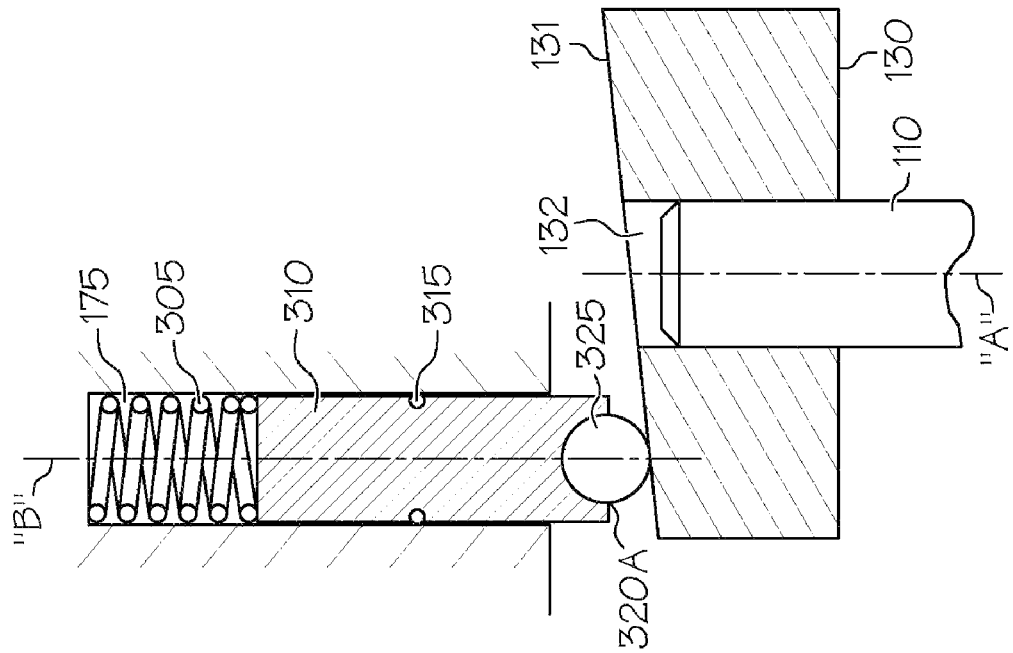
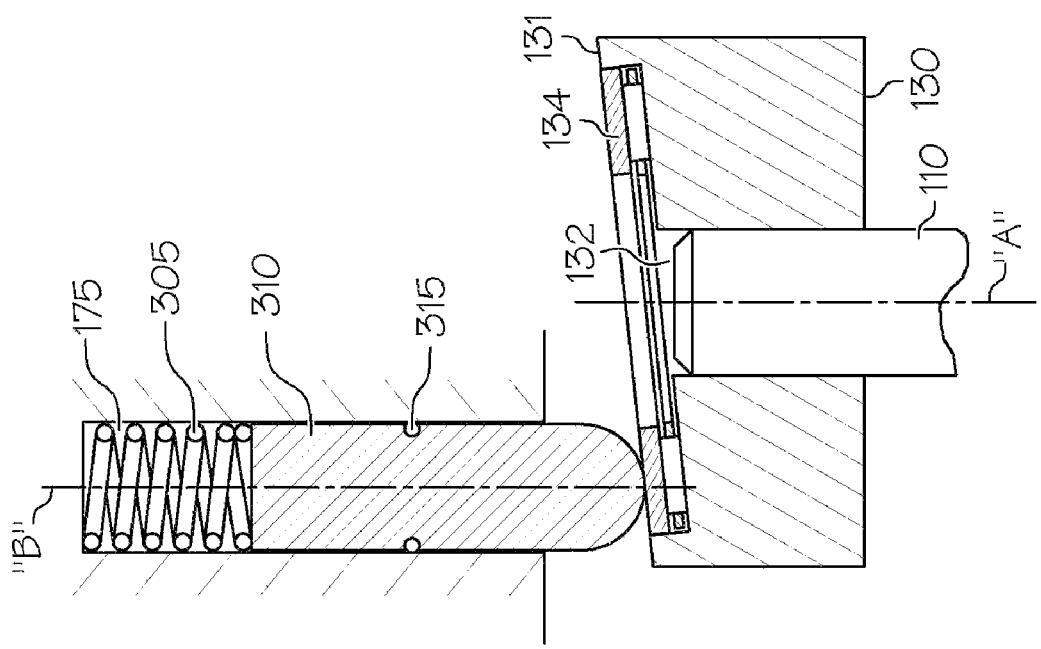

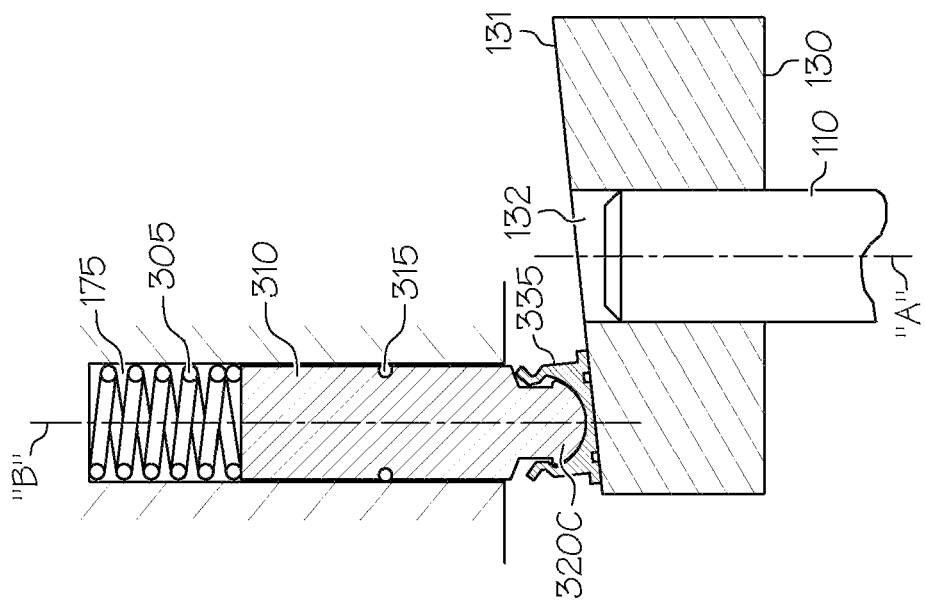
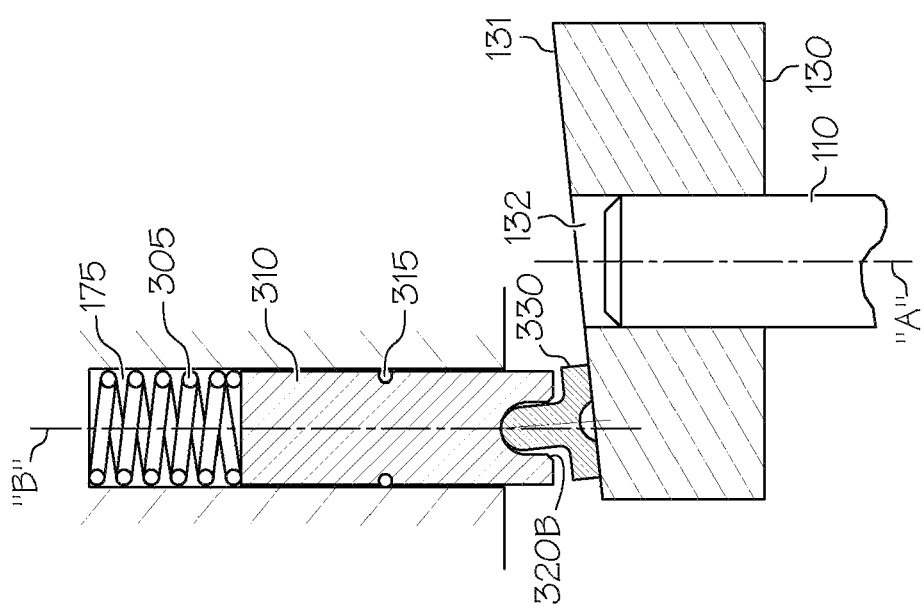

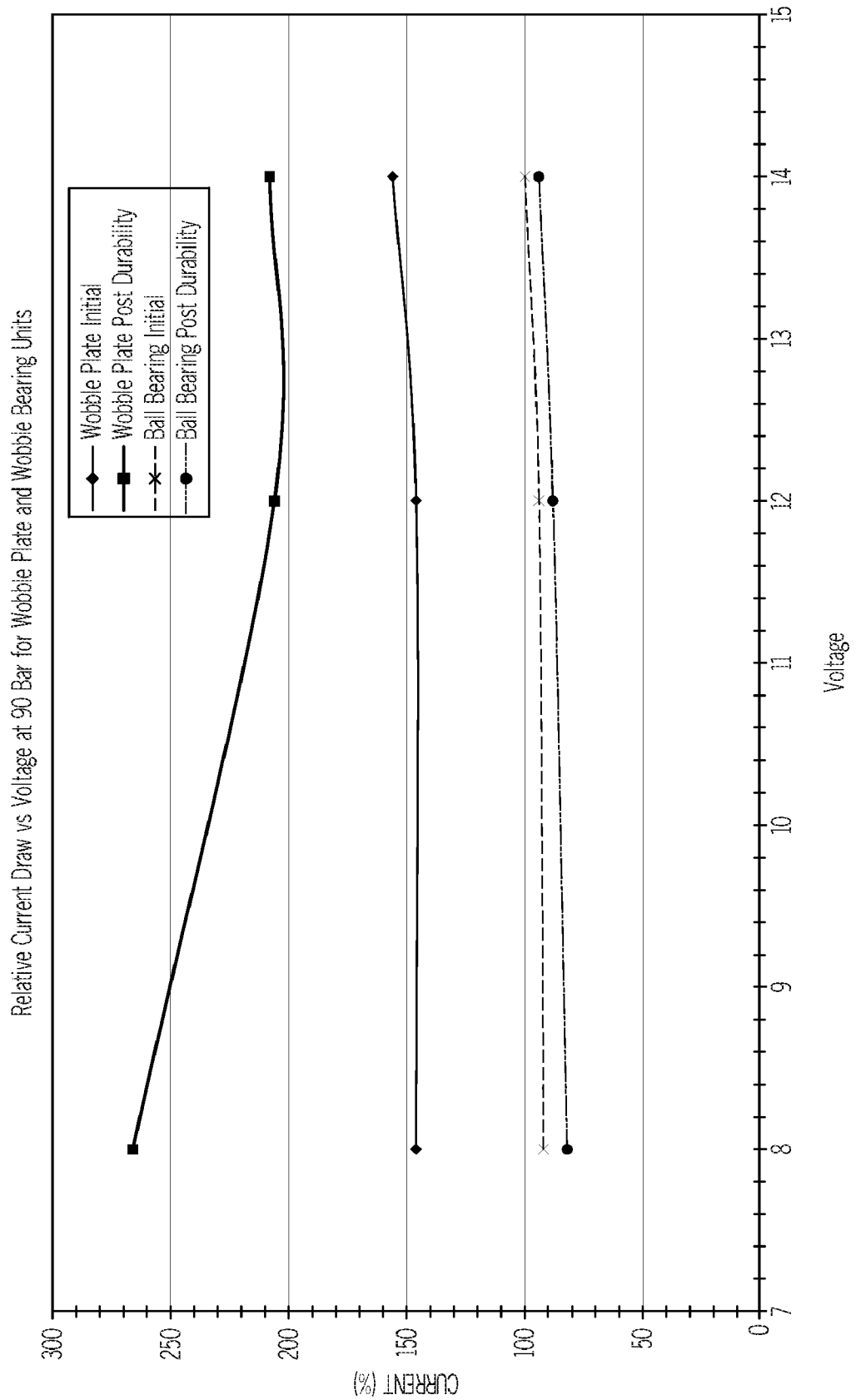

LINEAR SINGLE CHANNEL HYDRAULIC CONTROL UNIT

TECHNICAL FIELD

The present disclosure relates to anti-lock braking systems and, more particularly, to a hydraulic modulator unit for an anti-lock braking system.

BACKGROUND

Anti-lock braking systems are used in motor vehicles, including some motorcycles and motor scooters, to prevent vehicle wheels from locking against rotation when excessive braking force is applied to an individual wheel brake. Such systems control the brake fluid pressure applied to a wheel brake in a manner which maximizes the braking force yet allows the wheel to predominantly roll, rather than slide, across a road surface. A typical anti-lock braking system includes a number of wheel speed sensors, an electronic control unit ("ECU") which monitors the wheel speed sensors to detect and respond to wheel lockup, and a motorized hydraulic control unit ("HCU") which may be actuated by the ECU in response to wheel lockup to reduce and ultimately modulate the brake fluid pressure that is delivered to the affected wheel brake.

Anti-lock braking systems used in automobiles such as passenger cars and light trucks are conventionally designed as multiple channel units where the ECU and HCU are integrated to form an electro-hydraulic control unit ("ECHU"). The integration of the ECU and HCU permits constituent elements such as valve solenoids to be surface mounted on the ECU control circuit to reduce the complexity of assembly, while the provision of multiple channels permits the pumping elements servicing each channel to be driven by a common, suitably specified motor. The predominant method of providing multiple channels in an EHCU employs pairs of opposed piston pumps driven by a single cam or eccentric mounted on a motor shaft, so that the opposed piston pumps and common HCU motor are oriented perpendicular to each other within the overall device.

Anti-lock braking systems used on motorcycles and motor scooters are typically adapted from the multi-channel, integrated designs described above due to economies of scale. However while such systems can provide the braking performance required in these vehicles, their designs do not efficiently adapt to the spatial constraints and opportunities present in these vehicle framing systems. Accordingly, there is a need for a hydraulic modulator unit that is adapted for use with motorcycles, motor scooters, and other such vehicles having a generally open, comparatively planar frames.

SUMMARY

In a first aspect, a hydraulic control unit for a motor vehicle having a motor providing a drive shaft driving a rotatable piston bearing surface at a proximal end of the motor, a hydraulic block providing a.) an inlet for fluid communication with a braking fluid source and an outlet for fluid communication with a braking system brake, b.) a pump cavity housing a pumping assembly, and c.) first and second valve cavities housing first and second fluid control valves, and a control section providing first and second solenoid coils receiving portions of the first and second fluid control valves, respectively, with the pump cavity being disposed on a first end of the hydraulic block and the valve cavities being disposed on an opposite end of the hydraulic block, the motor, hydraulic block, and control section being secured together, and the pumping assembly being reciprocalably driven by the rotatable piston bearing surface along an axis radially disposed from and otherwise parallel to the axis of rotation of the rotatable piston bearing surface.

In a second aspect, a pump element for a hydraulic control unit having a motor including a drive shaft and a seat, with the seat providing a hub defining a cylindrical peripheral wall having a central longitudinal axis that is rotated out of alignment with the axis of rotation of the seat, a hydraulic block secured to the motor and providing a pump cavity having a motor-facing opening, a ball bearing assembly mounted on the hub at an oblique angle with respect to the axis of rotation of the seat, with a radially disposed portion of the ball bearing assembly positioned in alignment with the motor-facing opening, and a pumping assembly received in the pump cavity and reciprocally bearing against the radially disposed portion of the ball bearing assembly.

In a third aspect, a linear hydraulic control unit for a motor vehicle having a motor section including a drive shaft and a drive shaft seat, where the drive shaft and drive shaft seat define an axis of rotation, a hydraulic block including a pump cavity defining an axis of reciprocation radially disposed from and otherwise generally parallel to the axis of rotation, a ball bearing assembly mounted on the drive shaft seat at an oblique angle with respect to the axis of rotation, and a pumping assembly received within the pump cavity and bearing against a portion of the ball bearing assembly that is radially disposed from the axis of rotation, where the hydraulic block is secured to the motor section and the lateral extents of the hydraulic block generally correspond to the lateral extents of the motor section with respect to the axis of rotation.

BRIEF DESCRIPTION OF THE DRAWINGS

FIGS. 3A and 3B are perspective views of the hydraulic block shown in FIG. 2. The interior surfaces of the cavities and fluid channels are shown in solid lines within an outline of the hydraulic block 150 shown in FIG. 2.

FIG. 4A is a cross-sectional view of a wobble plate and pump assembly for use in the linear hydraulic control unit.

FIGS. 4B and 4C are cross-sectional views of alternate wobble plates for use in the linear hydraulic control unit.

FIGS. 5A, 5B, and 5C are cross-sectional views of alternate pump assemblies for use in the linear hydraulic control unit.

FIG. 7B is a chart of input current versus input voltage for wobble plate based and ball bearing based linear single channel hydraulic control units, showing both initial performance and performance at the completion of long term durability testing.

DETAILED DESCRIPTION

Figure 1A:
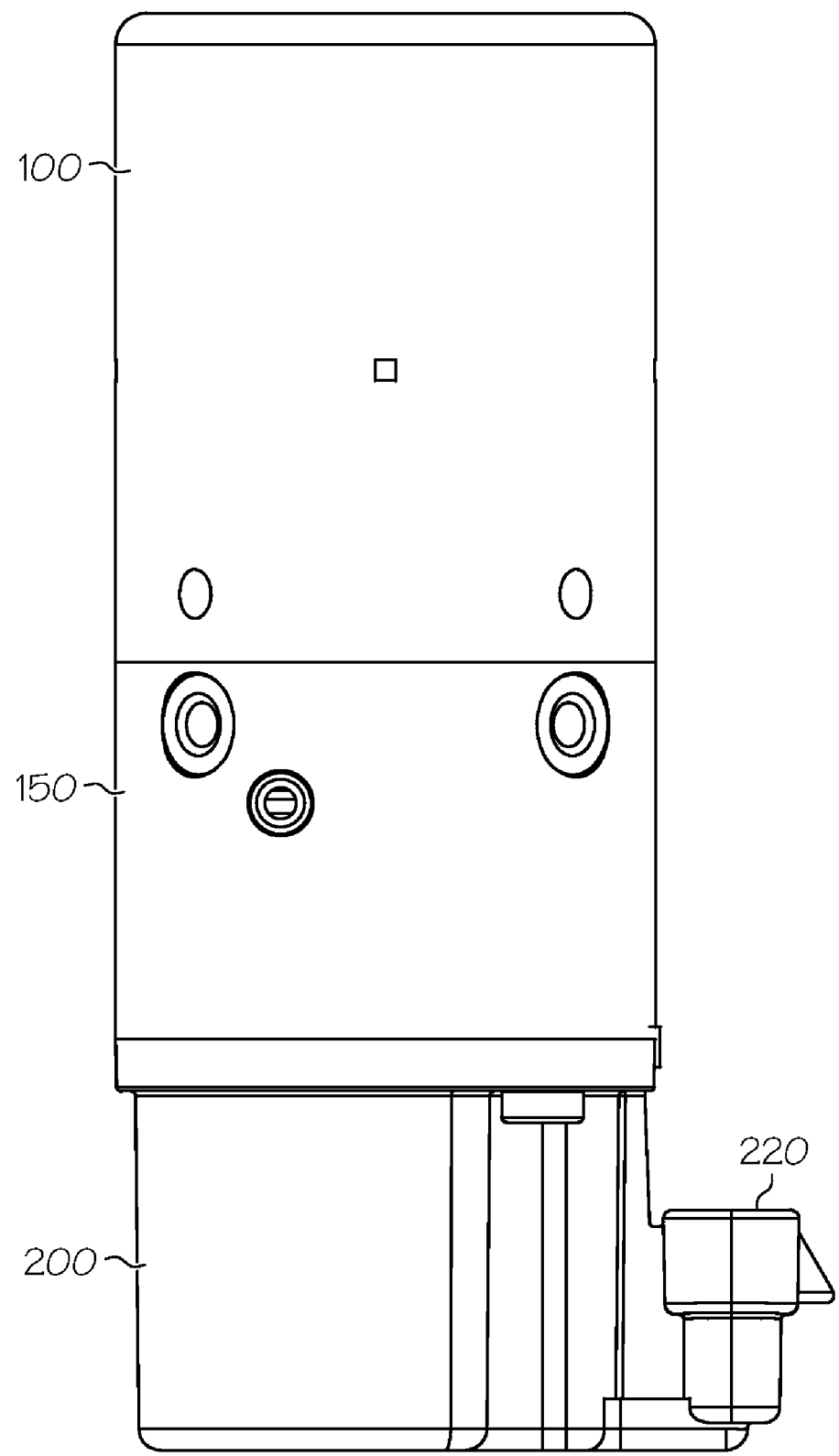
FIG. 1A is a side view of a linear hydraulic control unit.
Figure 1B:
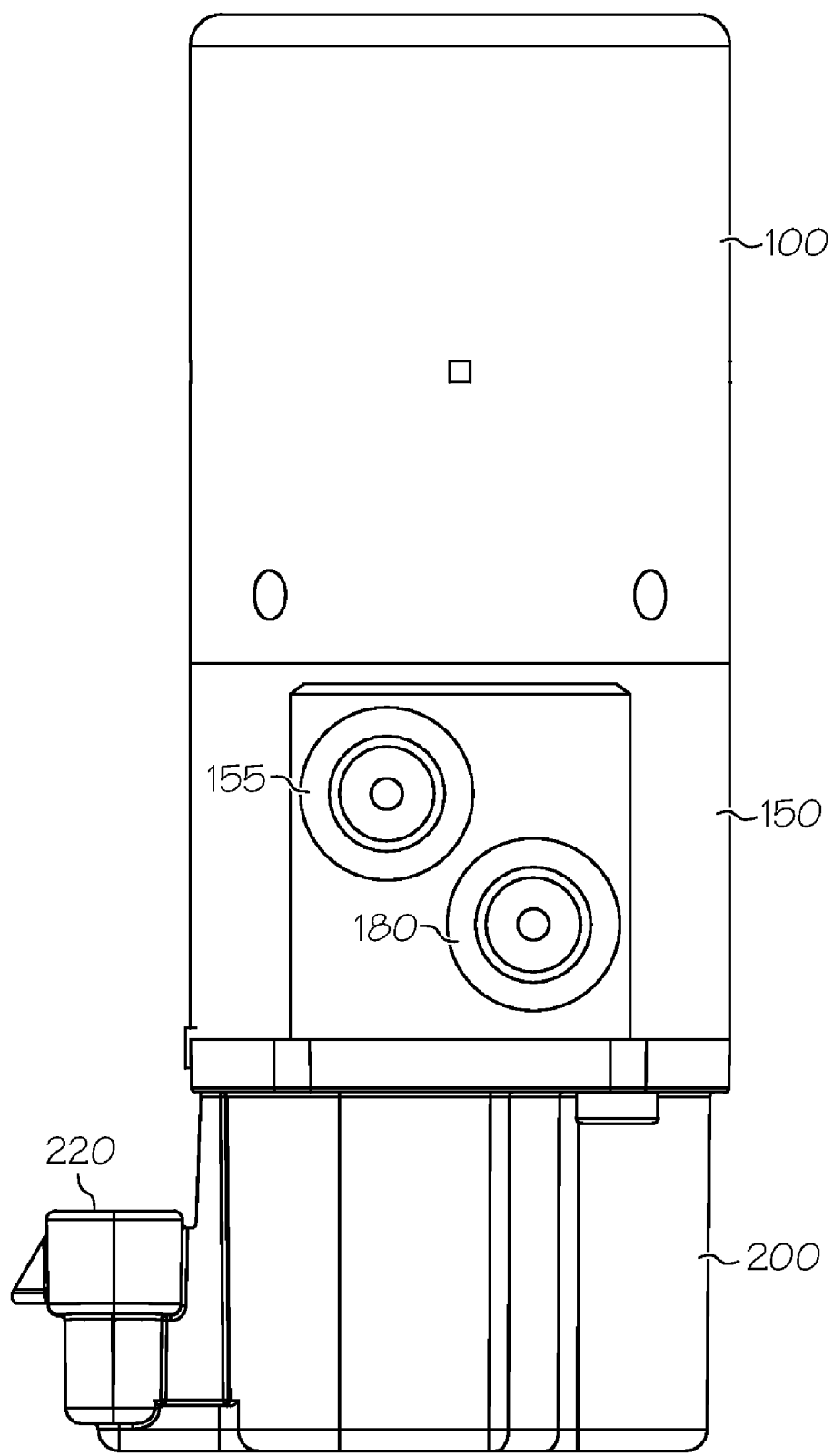
FIG. 1B is an opposite side view of a linear hydraulic control unit.

A generalized aspect of the disclosed hydraulic control unit ("HCU") is shown in FIGS. 1A and 1B. Such an HCU may comprise a motor section 100, a hydraulic block 150, and a control section 200, all of which are disposed in the described order so that the unit has a elongated cylindrical or "linear" configuration. These elements may be secured together to produce a device having three serially interlocking body sections, or may be positioned and serially mounted within enveloping housing elements to provide for greater protection from environmental conditions. Such an HCU will also include a modulator inlet 155 providing fluid communication with a braking fluid source such as a master cylinder, a modulator outlet 180 providing fluid communication with a brake such as a wheel disc brake, and a port 220 or electrical terminal providing communication with a vehicle electrical system.

Figure 2:
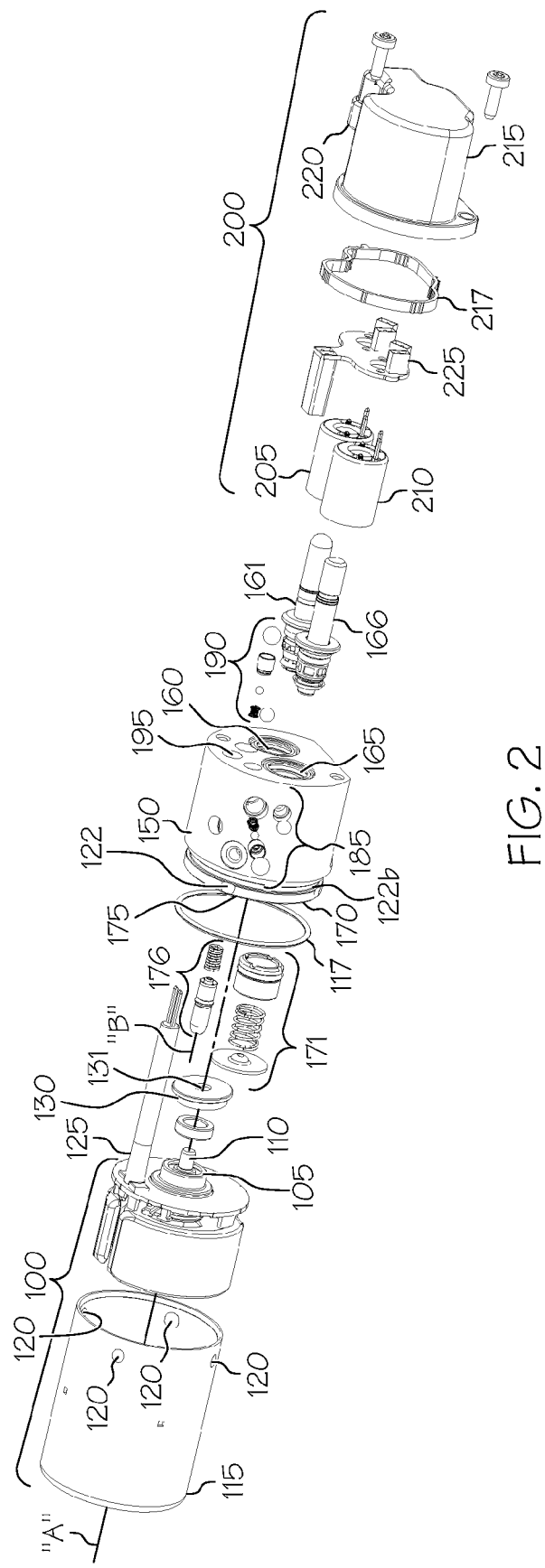
FIG. 2 is an exploded perspective view of the linear hydraulic control unit shown in FIGS. 1A and 1B.

As shown in the exploded view provided in FIG. 2, the motor section 100 provides a motor 101 including a motor bearing or bushing 105 and an interpenetrating drive shaft 110. The motor section housing 115 may be an external housing adapted for receiving the motor, or alternately may be the housing of a weatherproof motor which mates directly to the hydraulic block 150. The mating portions of the motor section housing 115 and hydraulic block 150 are preferably sealed to each other by a resilient seal 117 such as an elastomeric gasket or O-ring. The motor section may be secured to the hydraulic block 150 by various means, including a detent 120 provided at the mating end of the motor housing 115 for engaging a cavity 122 provided at the mating end of the hydraulic block 150. Preferably, the detent 120 is formed during final assembly by staking an overlapping portion of the motor housing 115 to the hydraulic block 150 at a plurality of locations around the periphery of the mating portions of the pieces with a punch, whereby the punch either forms both the detent 120 and the cavity 122 in the hydraulic block 120 or forms the detent 120 by pressing the motor housing 115 into a preformed cavity 122, which may be a peripheral groove for receiving the resilient seal 117. The motor section 100 may also provide a projecting power terminal 125 for connection through the hydraulic block 150 to the control section 200 of the unit. Alternately, the motor section may be provided with power through a separate wiring harness, or an auxiliary portion of a wiring harness also connecting to the control section 200 of the unit.

As further shown in the exploded view provided in FIG. 2, the motor section 100 may include a wobble plate 130 engaging the motor drive shaft 110. The wobble plate 130 has a variable thickness and provides a rotatable piston bearing surface 131 disposed at an oblique angle with respect to a longitudinal axis of rotation "A" and motor drive shaft 110, so that the plate 130 translates rotation of the shaft 110 into reciprocation of the piston bearing surface 131 of the plate 130 along a longitudinal axis of reciprocation "B" radially disposed from and otherwise parallel to longitudinal axis "A" (as observed from an external and fixed point of reference). Detail concerning the construction of the wobble plate 130 is provided below.

With further reference to FIGS. 2, 3A, and 3B, the hydraulic block 150 defines or generally contains many of the conventional elements of an automotive HCU, including a modulator inlet 155, an apply valve cavity 160 housing an apply valve assembly 161, a release valve cavity 165 housing a release valve assembly 166, an accumulator cavity 170 housing an accumulator assembly 171, a pump cavity 175 housing a pumping assembly 176, and a modulator outlet 180. As in many designs, the fluid connection between the accumulator cavity 170 and the pump cavity 175 includes an inline pump inlet check valve assembly 185, while the fluid connection between the pump cavity 175 and the modulator inlet side of the HCU includes an inline pump outlet check valve assembly 190. However in the "linear" configuration described herein, the pump cavity 175 and pumping assembly 176 are unconventionally longitudinally oriented and centered about longitudinal axis "B" so that they are radially offset from but otherwise parallel to motor drive shaft 110, with the cavity opening disposed on the motor section-facing end of the hydraulic block 150. The apply and release valve cavities 160 and 165, and correspondingly the apply and release valve assemblies 161 and 166, are also longitudinally oriented along axes that are parallel to longitudinal axis "A," with the cavity openings disposed on the control section-facing end of the hydraulic block.

As shown, the accumulator cavity 170, and correspondingly the accumulator assembly 171, is also longitudinally oriented along an axis that is parallel to the primary longitudinal axis "A," with the cavity opening disposed on the motor section-facing end of the hydraulic block 150. However since the accumulator assembly 171 is essentially entirely contained within the accumulator cavity 170, the cavity 170 could also be oriented along an axis that is perpendicular to but potentially offset from the longitudinal axis "A," with the cavity opening disposed on the side of the hydraulic block 150. In addition, if the motor section 100 includes a projecting power terminal 125, a longitudinal aperture 135 may be formed through the hydraulic block 150 from the motor section facing end to the control section facing end to permit the internal delivery of motor power through power terminal 125. This combination of longitudinally oriented features, and in particular the longitudinal orientation of the pumping cavity, permits the lateral extents of the HCU to generally correspond to the lateral extents of the motor section 100, yielding a device having a substantially cylindrical profile.

The HCU components are operated and fluidly interconnected in a conventional manner. To prevent wheel lockup during a braking event, the apply valve assembly 161 is closed to isolate the wheel brake connected to the modulator outlet 180 from the pressurized fluid being supplied to the modulator inlet 155. The release valve assembly 166 is subsequently opened to reduce brake fluid pressure at the modulator outlet side of the HCU by allowing brake fluid to flow into the accumulator cavity, compressing the accumulator assembly 171. The pumping assembly 176 draws fluid from the accumulator, through the pump inlet check valve assembly 185, and forces the fluid through the pump outlet check valve assembly 190 to the modulator inlet side of the HCU between the modulator inlet 155 and the closed apply valve assembly 161. When lockup ceases, the release valve assembly 166 is closed to isolate the accumulator, and the apply valve assembly 161 is subsequently opened to allow pressurized fluid to be supplied to the brake. Fluid connections between cavities in the HCU are preferably manufactured using orthogonal drilling techniques, with sealing balls 199 being press-fit into the mouths of the drilled bores to provide isolated fluid connections between modulator inlet 155, the above-identified cavities 160, 165, 170, and 175, and the modulator outlet 180.

With further reference to FIG. 2, the control section 200 comprises an apply valve solenoid coil 205 and a release valve solenoid coil 210 received within a housing 215. The solenoid coils 205 and 210, as well as the motor section's power terminal 125, if included, are electrically connected to an external port 220 or terminal (not shown) which receives an end of a wiring harness connected to a remote ECU. Preferably, the solenoid coils 205, 210 and power terminal 125, if present, are both positioned by and connected to the external port or power terminal by a plastic guide device 225 that acts to position and shield the electrical wires, pins, and pads that interconnect the internal components and the external port or power terminal. The solenoid coils are received within the control section housing 215 and positioned such that the apply valve solenoid coil 205 operatively engages projecting portions of the apply valve assembly 161 and the release valve solenoid coil 210 operatively engages projecting portions of the release valve assembly 166. The housing 215 may be adapted to mate directly to the hydraulic block 150, or may be configured to mate to the motor section housing 115 such that the hydraulic block 150 is substantially enclosed between the respective housings 215, 115 while providing access, at a minimum, to modulator inlet 155 and modulator outlet 180. The control section housing 215 preferably includes a resilient seal 217 such as an elastomeric gasket or O-ring for sealing this portion of the device against the hydraulic block 150.

As shown in FIG. 4A and previously described above, the wobble plate 130 includes a piston bearing surface 131 disposed at an oblique angle with respect to longitudinal axis "A" and motor drive shaft 110 so that the plate 130 translates rotation of the shaft 110 into reciprocation of the piston bearing surface 131 of the plate 130 along longitudinal axis "B," which is radially disposed from and otherwise parallel to longitudinal axis "A" (as observed from an external and fixed point of reference). The piston bearing surface 131 is preferably disposed at a dihedral angle of about 2 to about 10 degrees with respect to a plane perpendicular to longitudinal axis "A." The wobble plate 130 may be a generally disc-shaped, metal or plastic part defining an aperture 132 for mating engagement with the motor drive shaft 110. The piston bearing surface 131 may be part of a substantially planar surface such as that shown in FIG. 4A, or an arcuate track generally formed into the part, an arcuate relief projecting generally above the part, or a combination of the foregoing. In the latter cases, the piston bearing surface is not necessarily planar and may have arcuate aspects in every dimension, so that the piston bearing surface is preferably disposed at a range of angles with an absolute value of about 5 degrees or less with respect to a plane perpendicular to longitudinal axis "A" and containing the points of bearing contact corresponding to the median reciprocating position of the pumping assembly 176. Additionally, as in variant constructions shown in FIGS. 4B and 4C, the piston bearing surface 131 may be a washer 133 or a needle bearing 134 affixed to the part. Such variant constructions may be employed in order to provide a piston bearing surface 131 having increased durability or reduced frictional resistance, depending upon the particular configuration and constituent materials selected for the wobble plate 130 and abutting pump element.

Further, various pumping assemblies 176 may be combined with the wobble plate 130 to provide a longitudinally oriented pump which reciprocates along longitudinal axis "B" in response to rotation of the plate 130. In general, as shown in FIG. 2, the pump 300 comprises the wobble plate 130, pump cavity 175, and pumping assembly 176, but more specifically, as show in FIG. 4A, the pump 300 comprises a return spring 305 inserted within the pump cavity 175 and biased to press an elongated piston 310 against the pump bearing surface 131 of the wobble plate 130. Preferably, the elongated piston 310 includes resilient seal 315 such as an elastomeric O-ring to substantially seal the pump 300 and pump cavity 175 against the leakage of pressurized brake fluid. Additionally, as in variant constructions shown in FIGS. 5A-5C, elongated piston 310 may define a concavity 320A for receiving a ball element 325, a profiled slot or concavity 320B for receiving a internal shoe 330, or a profiled projection 320C for engaging and retaining an external shoe 335.

Such variant constructions may be employed in order to provide an abutting pump element having increased durability or reduced frictional resistance, depending upon the particular configuration and constituent materials selected for the wobble plate 130 and ball 325 or shoes 330, 335.

Figure 6:
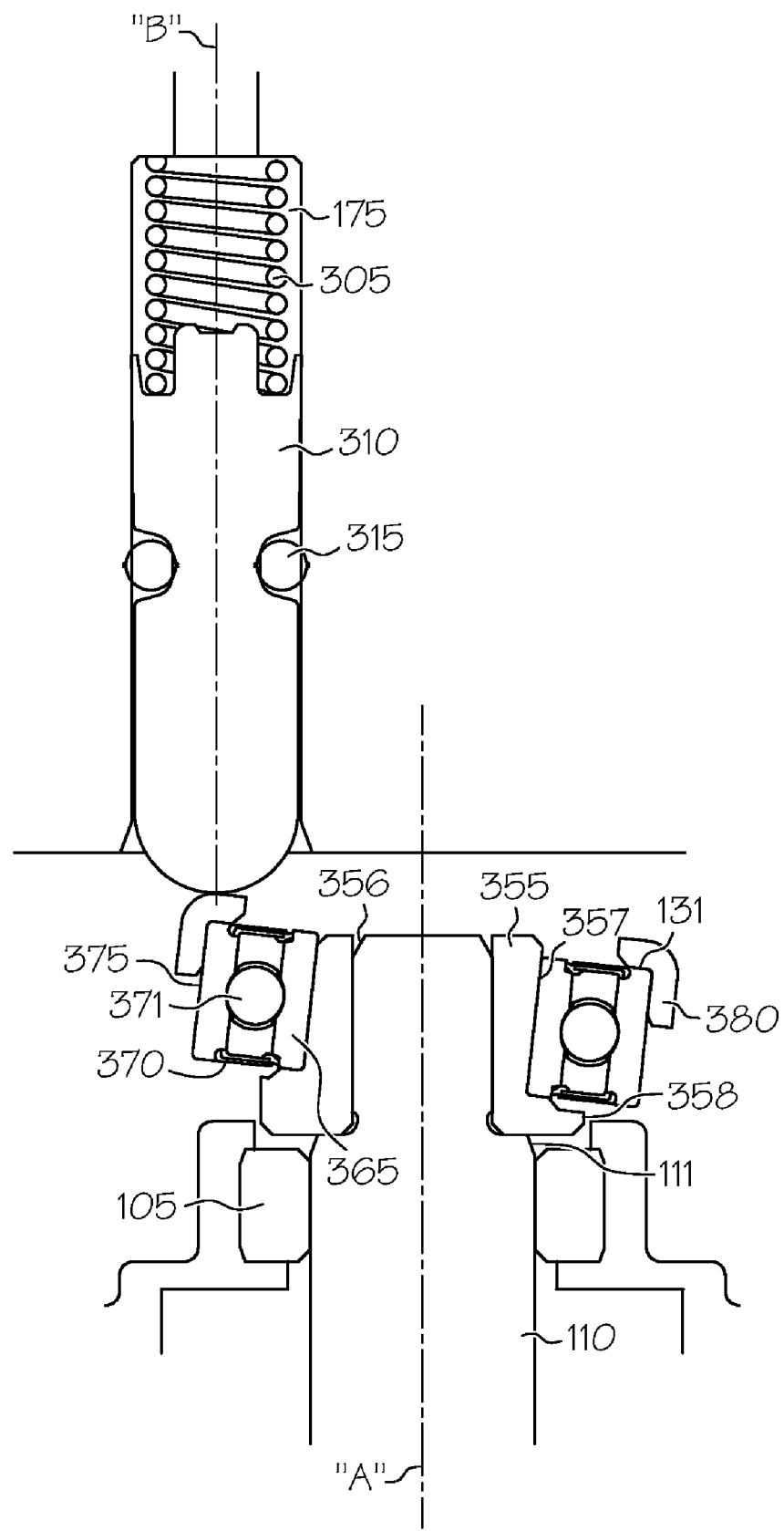
FIG. 6 is a cross-sectional view of a ball bearing and pump assembly for use in the linear hydraulic control unit.

As shown in FIG. 6, an alternate aspect of the pump 300 may substitute a drive shaft seat 350 and ball bearing 360 for the wobble plate 130 described above. The seat 350 is similarly affixed to the motor drive shaft 110, but provides a hub 355 for receiving and positioning a ball bearing 360 at an oblique angle with respect to a longitudinal axis of rotation "A" and the motor drive shaft 110 so that the seat 350 and ball bearing 360 translate rotation of the shaft 110 into reciprocation of a piston bearing surface 131 of the ball bearing 160 along longitudinal axis "B," which is radially disposed from and otherwise parallel to longitudinal axis "A" (as observed from an external and fixed point of reference). Less preferably, motor drive shaft 110 could be machined to provide an integral seat 350, but such a configuration is likely to be significantly more expensive than an affixed plastic part. A side of the ball bearing generally defines the piston bearing surface 131, and is preferably disposed at a dihedral angle of about 2 to about 10 degrees with respect to a plane perpendicular to longitudinal axis "A."

The hub 355 of an affixed seat 350 defines an aperture 356 for mating engagement with the motor drive shaft 110, and in all seats 350 provides a cylindrical peripheral wall 357 with a central longitudinal axis that is rotated out of alignment with the axis of rotation of the hub 355 through an angle corresponding to the desired oblique angle. The hub 355 of an affixed seat 350 preferably includes a base portion 358 adapted to abut a shoulder portion 111 of the motor drive shaft 110, or less preferably the motor bearing or bushing 105, in order to simplify installation in comparison to press-fit, welded, or adhesively affixed mountings. The ball bearing 360 may be a typical ball bearing assembly comprising an inner race 365, a cage 370 and plurality of balls 371, and an outer race 375. A side surface of the outer race 375 generally defines the piston bearing surface 131, but preferably includes an additional ring 380 that may be press-fit or otherwise affixed to the outer race 375 to provide a broader surface for bearing engagement by the pumping assembly 176. These unconventional uses of the ball bearing 360 resolve forces between the motor drive shaft 110 and pumping assembly 176 through the sides of the inner race 365 and outer race 375, respectively, rather than through the conventional bearing surfaces of each race, but have been found to both significantly increase the durability of the pump 300 and significantly reduce frictional energy loss in the pump 300. Advantageously, the reduction in frictional energy losses permits a significant reduction in the rated power—and correspondingly the size—of the motor in the motor section 100.

Figure 7A:
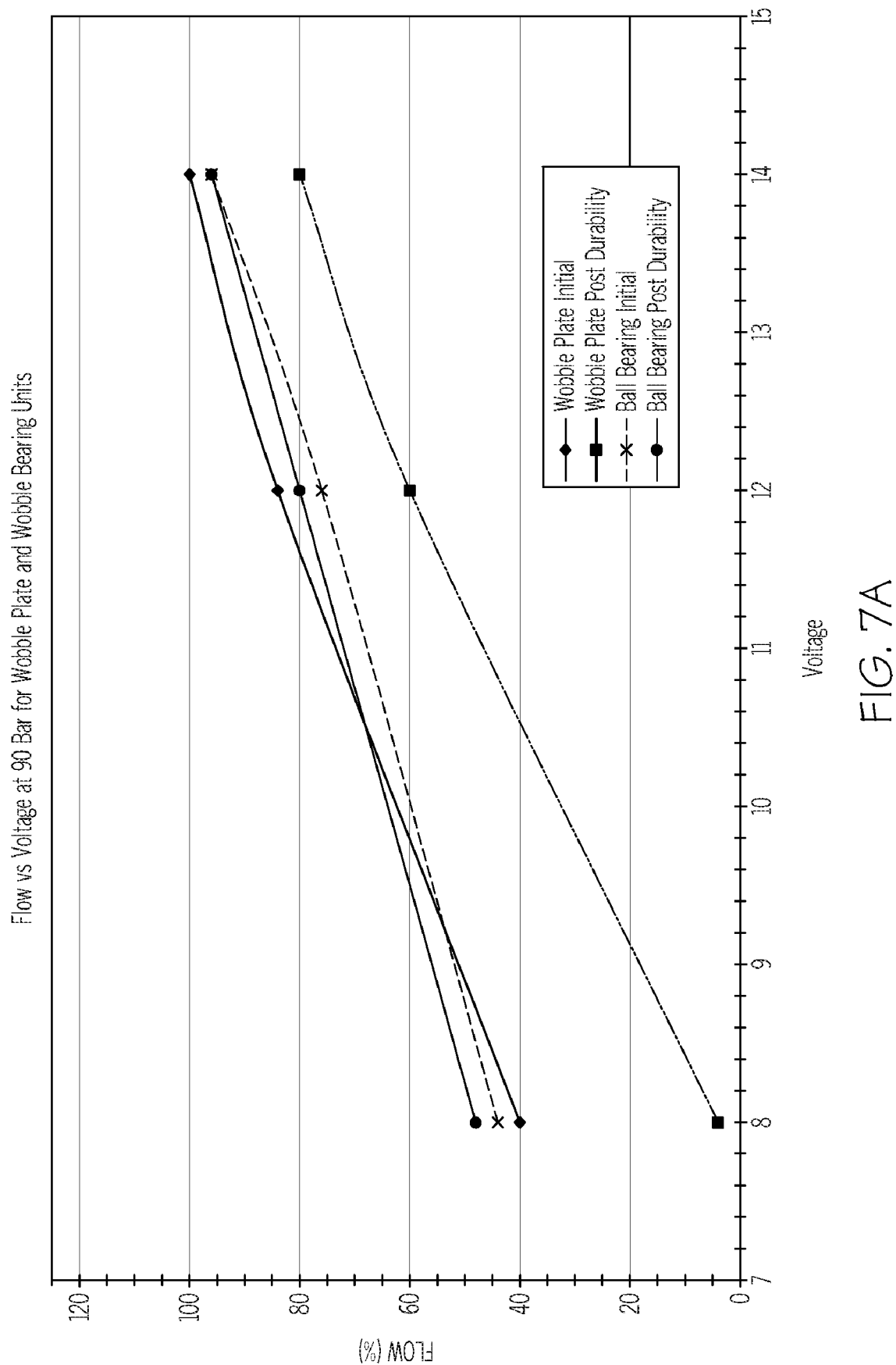
FIG. 7A is a chart of fluid flow versus input voltage for wobble plate based and ball bearing based linear single channel hydraulic control units, showing both initial performance and performance at the completion of long term durability testing.

FIGS. 7A and 7B illustrate test results comparing a pump 300 such as that shown in FIG. 4A with a pump 300 such as that shown in FIG. 6. The wobble plate based pump combined a PEEK polymer piston 310 and a steel wobble plate 130 providing a planar bearing surface 131 disposed at a dihedral angle of 6 degrees with respect to a plane perpendicular to longitudinal axis "A." The wobble plate was initially lubricated with a low temperature grease marketed by Nye Lubricants of Fairhaven, Mass. The ball bearing based pump combined a PEEK polymer piston 310 and a standard, single row miniature ball bearing 360 including a low carbon steel ring 380 press fit to the outer race, with the piston bearing side 131 of the ball bearing 360 disposed at a dihedral angle of 6 degrees with respect to a plane perpendicular to longitudinal axis "A." The ball bearing based pump was not lubricated.

With regard to FIG. 7A, performance of the respective pumps, as determined by flow rate at a predetermined voltage, was similar for both the wobble plate based and ball bearing based pumps during initial operation. However, at the completion of long term durability testing, the flow rates produced by the wobble plate based pump decreased significantly, while the flow rates produced by the ball bearing based pump were similar to those observed during initial operation. Because the pumps operate as positive displacement pumps, the decreased flow rates observed in the worn wobble plate based pump are primarily attributable to slower operation of the pump, which is primarily attributable to an increase in frictional energy loss. With regard to FIG. 7B, the efficiency of the respective pumps 300, as determined by comparison of current draw at a predetermined voltage, was significantly higher for the ball bearing based pump than the wobble plate based pump during initial operation. In addition, at the completion of long term durability testing, the efficiency of the ball bearing based pump was similar to that observed during initial operation, whereas the efficiency of the wobble plate based pump was significantly lower than that observed in any other configuration or state. In particular, testing revealed that the power requirement of a ball bearing based pump could be less than half that of a worn wobble plate based pump. Such a difference permits ABS pump designers to specify motors with significantly reduced rated powers, and correspondingly to reduce both the size and the lateral extents of the motor section 100 of the HCU.

The single channel hydraulic control units disclosed herein provide significant advantages over other hydraulic control units known to have been used in motorcycles, motor scooters, and other similar vehicles. The single channel configuration permits ABS operation within only a single hydraulic circuit, which can result in reduced vehicle current draw. The single channel configuration also permits the inline mounting of HCUs between the master cylinder(s) and wheel brakes, which permits a reduction in the length and routing complexity of vehicle brake lines and a corresponding reduction in the difficulty of bleeding air from the braking system. The reduction in the length of vehicle brakes lines also permits a reduction in in-circuit brake fluid volume, which can provide increased responsiveness and performance, i.e., a tighter and stiffer brake circuit. The single channel configuration further provides an element of redundancy, so that the failure of an ABS modulator will not cause a total loss of braking or ABS braking capability in the vehicle. In particular, the linear single channel configuration complements these advantages by providing greater flexibility in the mounting of the ABS modulator, allowing mountings abutting tubular framing elements with small lateral clearances such as protected spaces between wheel forks, shocks, swingarms, and the like, as well as spaces running along body frame elements in split cradle frames, double cradle frames, trellis frames, and the like. Mountings along wheel forks, shocks, and swingarms in particular allow for further reductions in brake line length and routing complexity.

The ball bearing based single channel hydraulic control unit disclosed herein provides further advantages, in that the use of an unconventionally mounted ball bearing increases the durability of the pump, reduces frictional energy loss in the pump, reduces side forces acting on the piston element of the pump, and permits the substitution of a comparatively inexpensive polymer piston, such as a PEEK piston, for a comparatively expensive metal piston, such as a hardened steel piston.

Although preferred embodiments of the present invention have been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

What is claimed is:

1. A hydraulic control unit for a motor vehicle, the hydraulic control unit comprising:
   a motor providing a shaft driving a rotatable piston bearing surface, wherein said shaft and said piston bearing surface are disposed at a proximal end of said motor;
   a hydraulic block providing
      a.) an inlet for fluid communication with a braking fluid source and an outlet for fluid communication with a braking system brake,
      b.) a pump cavity housing a pumping assembly and having an opening disposed on a first end, and
      c.) first and second valve cavities housing first and second fluid control valves, each of said valve cavities having an opening disposed on a second end opposite said first end; and
   a control section providing first and second solenoid coils receiving portions of said first and second fluid control valves, respectively, at a proximal end thereof,
   wherein said motor and said first end of said hydraulic block and said control section and said second end of said hydraulic block are secured together with said pumping assembly being reciprocalably driven by said rotatable piston bearing surface along an axis radially disposed from and otherwise parallel to the axis of rotation of said rotatable piston bearing surface to, in part, modulate fluid pressure at said outlet during a braking event.

2. The hydraulic control unit of claim 1, wherein said piston bearing surface is disposed at an oblique angle with respect to said axis of rotation.

3. The hydraulic control unit of claim 2, wherein said piston bearing surface is disposed at a dihedral angle of about 2 to about 10 degrees with respect to a plane perpendicular to said axis of rotation.

4. The hydraulic control unit of claim 3, wherein said piston bearing surface is provided by a washer disposed on a wobble plate.

5. The hydraulic control unit of claim 3, wherein said piston bearing surface is provided by an annular needle bearing disposed on a wobble plate.

6. The hydraulic control unit of claim 2, wherein said piston bearing surface is provided by a wobble plate having a substantially planar surface.

7. The hydraulic control unit of claim 2, wherein said piston bearing surface is defined by a side surface of an outer race of a ball bearing.

8. The hydraulic control unit of claim 2, wherein said piston bearing surface is defined by a ring affixed to an outer race of a ball bearing and interposed between said pumping assembly and a side surface of said outer race.

9. The hydraulic control unit of claim 1, wherein said piston bearing surface is disposed at a range of angles with respect to a plane both perpendicular to said axis of rotation and containing points of bearing contact corresponding to the median reciprocating position of said pumping assembly.

10. The hydraulic control unit of claim 9, wherein said range of angles has an absolute value of about 5 degrees or less.

11. The hydraulic control unit of claim 9, wherein said piston bearing surface is an arcuate track generally formed into a part, an arcuate relief projecting generally above a part, or a combination of said arcuate track and said arcuate relief provided on a part.

12. A pump element for a hydraulic control unit, the pump element comprising:
   a motor including a drive shaft and a seat, wherein said seat provides a hub defining a cylindrical peripheral wall having a central longitudinal axis that is rotated out of alignment with the axis of rotation of said seat;
   a hydraulic block secured to said motor and providing a pump cavity having a motor-facing opening;
   a ball bearing assembly mounted on said hub of said seat, wherein said ball bearing assembly is mounted at an oblique angle with respect to the axis of rotation of said seat and a radially disposed portion of said ball bearing assembly is positioned in alignment with said motor-facing opening; and
   a pumping assembly received in said pump cavity, wherein said pumping assembly generally and reciprocally bears against said radially disposed portion of said ball bearing assembly.

13. The pump element of claim 12, wherein said ball bearing assembly is mounted at a dihedral angle of about 2 to about 10 degrees with respect to a plane perpendicular to said axis of rotation.

14. The pump element of claim 13, wherein said seat is integrally formed on said drive shaft.

15. The pump element of claim 13, wherein said seat is affixed to said drive shaft and abuts a shoulder portion of said drive shaft.

16. The pump element of claim 12, wherein said ball bearing assembly includes a ring affixed to an outer race and interposed between said pumping assembly and a side surface of said outer race.

17. A linear hydraulic control unit for a motor vehicle, the hydraulic control unit comprising:
   a motor section including a drive shaft and a drive shaft seat, wherein said drive shaft and drive shaft seat define an axis of rotation;
   a hydraulic block secured to said motor section and including a pump cavity defining an axis of reciprocation radially disposed from and otherwise generally parallel to said axis of rotation;
   a ball bearing assembly mounted on said drive shaft seat at an oblique angle with respect to said axis of rotation; and
   a pumping assembly received within said pump cavity and bearing against a portion of said ball bearing assembly that is radially disposed from said axis of rotation,
wherein the lateral extents of said hydraulic block generally correspond to the lateral extents of said motor section with respect to said axis of rotation.

18. The linear hydraulic control unit of claim 17, wherein said ball bearing assembly is mounted at a dihedral angle of about 2 to about 10 degrees with respect to a plane perpendicular to said axis of rotation.

19. The linear hydraulic control unit of claim 17, wherein said ball bearing assembly includes a ring affixed to an outer race and interposed between said pumping assembly and a ball bearing.

20. The linear hydraulic control unit of claim 17, wherein said motor section is secured to said hydraulic block by staked portions of said motor section and said hydraulic block.

* * * * *